United States Patent [19]

Blasko et al.

[11] Patent Number: 5,022,852

[45] Date of Patent: Jun. 11, 1991

[54] ROTARY KILN

[75] Inventors: Michael Blasko, Gladbeck; Hans-Peter Wenning, Raesfeld, both of Fed. Rep. of Germany

[73] Assignee: Veba Oel Entwicklungs-Gesellschaft mbH, Gelsenkirchen, Fed. Rep. of Germany

[21] Appl. No.: 405,231

[22] Filed: Sep. 11, 1989

[30] Foreign Application Priority Data

Sep. 9, 1988 [DE] Fed. Rep. of Germany ....... 3830678

[51] Int. Cl.[5] .......................... F27B 7/24; F16J 15/38

[52] U.S. Cl. .................................. 432/115; 432/242; 277/85

[58] Field of Search .................. 432/115, 242; 34/242

[56] References Cited

U.S. PATENT DOCUMENTS

| | | | |
|---|---|---|---|
| 4,183,726 | 1/1980 | Seebald | 432/118 |
| 4,457,520 | 7/1984 | Grachtrap | 432/115 |

FOREIGN PATENT DOCUMENTS

| | | | |
|---|---|---|---|
| 1202207 | 9/1965 | Fed. Rep. of Germany . | |
| 1783016 | 8/1970 | Fed. Rep. of Germany . | |
| 2263220 | 7/1974 | Fed. Rep. of Germany | 432/115 |
| 3407236 | 9/1985 | Fed. Rep. of Germany . | |
| 905278 | 4/1945 | France | 432/115 |

*Primary Examiner*—Albert W. Davis, Jr.

*Attorney, Agent, or Firm*—Oblon, Spivak, McClelland, Maier & Neustadt

[57] ABSTRACT

With this rotating cylinder driven on the outer periphery and running on rollers with pipes or connections that are provided in the area of the rotating cylinder heads connected to the rotating cylinder ends for product intake, product gas removal, and solid matter discharge for thermal treatment, low-temperature carbonization or pyrolysis of liquid or solid substances or mixed phases by indirect heating, to improve the sealing function and increase the service life of the sealing packings there is provided between the driven and the stationary parts of the rotating cylinder on both the intake and the discharge side a floating slide ring sealing system. A nonpositive frame structure for each makes possible a revolving joint between the rotating cylinder and the two stationary rotating cylinder heads connected with the pipes or connections.

9 Claims, 2 Drawing Sheets

ROTARY KILN

FIELD OF THE INVENTION

The invention relates to a rotating cylinder in a rotary kiln driven on the outer periphery and running on rollers by means of bearing races placed axially symmetrically on the outer periphery of both rotating cylinder ends with pipes or connections provided in the area of the rotating cylinder heads connecting to the rotating cylinder ends for product intake, product gas removal, and solid matter discharge. The rotating cylinder is used for thermal treatment, low-temperature carbonization, or pyrolysis of liquid or solid substances or mixed phases by indirect heating by a stationary muffle placed around the rotating cylinder jacket.

BACKGROUND OF THE INVENTION

A technical embodiment of a low-temperature carbonization of residues containing hydrocarbons is described in "Die Katalytische Druckhydrierung von Kohlen, Teeren und Mineraloelen" (*The Catalytic Hydrogenation Under Pressure of Coals, Tars, and Crude Oils*) Springer-Verlag, Berlin/Goettingen/Heidelberg, 1950. According to that treatise, the liquid residue containing hydrocarbons and heated to about 400° C. to 450° C. is sprayed into the low-temperature carbonization chamber, which is heated by external gas heating to about 550° C. to 600° C. A distillation to coke occurs, and the distilling off of the recoverable hydrocarbon oil portion can be promoted by countercurrent addition of about 10% of superheated steam. The low-temperature residue is removed by water immersion at the end of the furnace opposite the intake (see page 45). Thus, such devices that were placed on the discharge side inclined slightly downwardly from the horizontal were often provided as so-called ball furnaces with a feed of steel balls to cause, by flat ribs welded on as drivers in the lengthwise direction, the balls in the rotating furnace to be driven as high as possible so that, when falling, they knocked the forming encrustations loose (see page 254).

In addition to the working up of residues containing hydrocarbons coming from coal or crude oil, waste substances such as synthetic wastes, residues laden with hydrocarbons, contaminated soil, biomasses, sludges, and the like can be worked up by low-temperature carbonization into liquid product and low-temperature tar in addition to low-temperature gas and low-temperature coke.

Therefore, it has been proposed to subject household, industrial, and commercial garbage and special waste substances to a low temperature pyrolysis in a suitable reactor (e.g., a rotary kiln). See, e.g., DE-PS 29 47 293 and EP-0 111 081 Al.

Comparatively few publications discuss the equipment side of such processes, especially the making available of improved rotating cylinder designs. A satisfactory sealing of the rotating parts of a rotating cylinder from the stationary parts that receive the product feed or product discharge pipes is still a technical problem the solution of which causes considerable difficulties because of the prevailing mechanical and thermal stresses.

Therefore, according to DE 33 46 338 Al there has been proposed a sealing arrangement with a slide ring sealing system and a sealing disk placed on a rotating part of a rotating cylinder as well as sealing, adjacent thrust rings.

Significant drawbacks of the standard-built rotating cylinder designs known in the prior art are the heat losses in the area of the bearing races built directly into the rotating cylinder, the problems that have occurred in sealing between the stationary rotating cylinder heads and the rotating cylinder, and the problems associated with the thermal expansion of the rotating cylinder.

The heat losses associated with the bearing races and also with the drive of the rotating cylinder, which is often performed as a chain drive by gearwheels, also lead to a decrease in the liquid product yield because of premature condensation with subsequent cracking and polymerization reactions. The known rotating cylinder designs are usually designed with a soft, axial expansion compensator for the rotating cylinder head. The sealing function of the sealing part (for example, rotating with pressure rollers pressed on the stationary sealing part and containing two sealing packings) is considerably impaired by rotating cylinder eccentricities.

OBJECTS OF THE INVENTION

From these shortcomings there is derived the principal object of the invention—namely, to contribute, by an improved thermal insulation, especially in the area of the bearing races of the rotating cylinder, to better thermal and chemical efficiency.

Another object of the invention consists in contributing, by an improved structural arrangement of the elements of the slide ring sealing system, to an improved sealing function and a considerably increased service life of the sealing packings between the driven and the stationary parts of the rotating cylinder.

SUMMARY OF THE INVENTION

These objects are achieved with a rotating cylinder design of the kind mentioned initially by providing on both the intake and the discharge side a floating slide ring sealing system with a nonpositive frame structure which makes possible a revolving joint between the rotating cylinder and the two stationary rotating cylinder heads connected with the pipes or connections.

An advantageous embodiment of the slide ring sealing system according to the invention is one in which the slide ring sealing system exhibits an elastic sealing part with a hydraulic, pneumatic, or spring tensioned follow-on compensator unit to compensate for the wear of the individual sealing elements.

The proposed slide ring sealing system with, for example, a ball bearing frame structure and nonpositive connection to the rotating cylinder head makes it possible for the rotating cylinder head to keep up with all the movements of the rotating cylinder except for the rotating movement around the axis of rotation.

With this measure, only the product feed or discharge pipes still need to be compensated for. In contrast, in the embodiments according to the prior art, all relative movements of the rotating cylinder head had to be compensated for by the entire diameter of the rotating cylinder.

By the structural unit of a ball bearing turning connection, as explained in more detail below, with the elastic part of the slide ring seal in a frame structure, an exact guiding of the seal exists, and a simple expansion compensation to compensate for the wear of the sealing elements such as packings, metal rings, or the like is possible. In this way, intake and discharge heads, "freely floating," keep up with all movements—especially including the thermal expansion of the rotating cylinder exceeding the wear of the sealing elements by a multiple.

DETAILED DESCRIPTION OF THE PRESENTLY PREFERRED EMBODIMENTS

Figure 1:
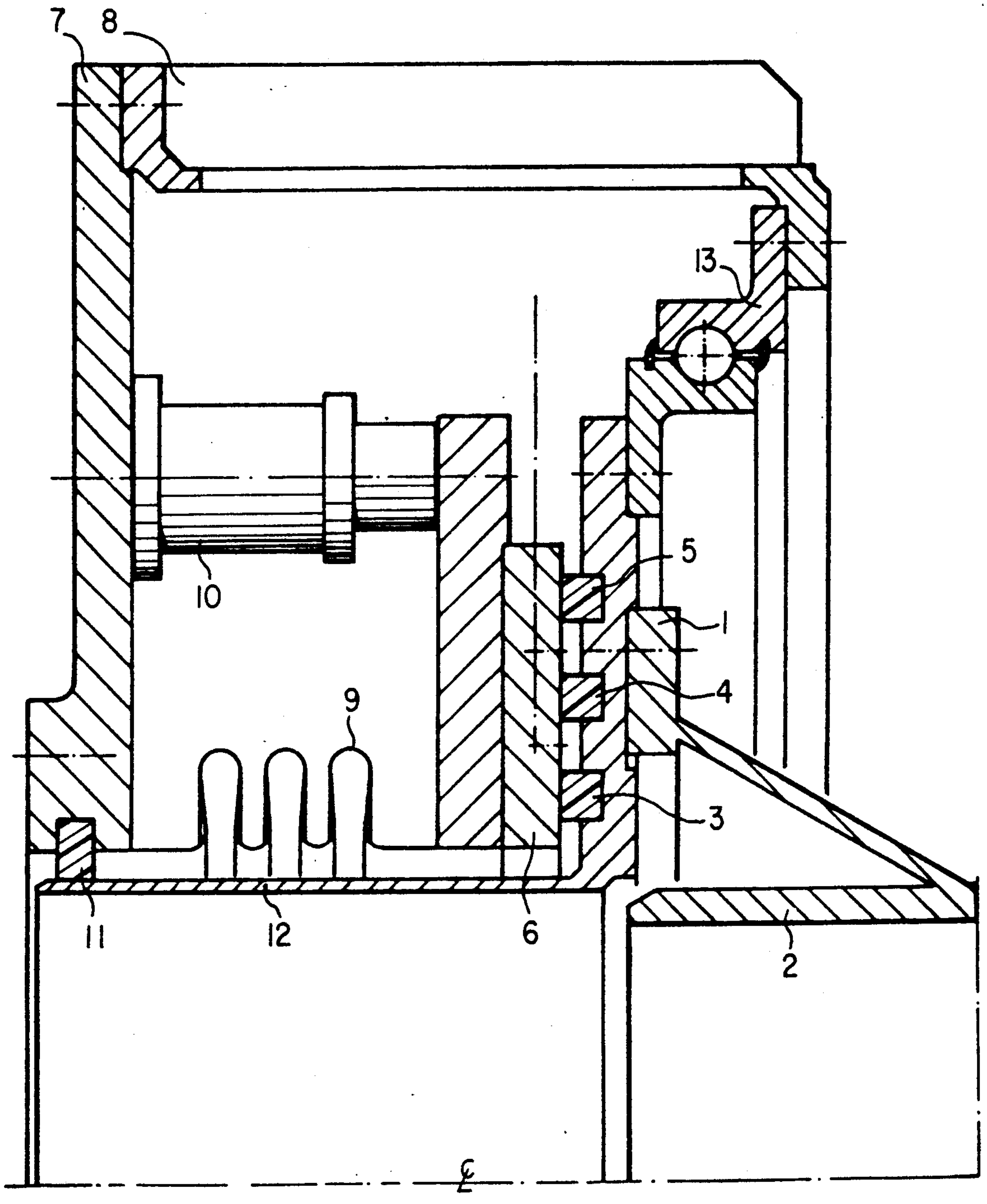
FIG. 1 is a schematic cross-sectional view of a slide ring sealing section according to the invention.

A rotating sealing flange 1 screwed onto the rotating part of a seal is welded over its entire periphery to the outer jacket of a rotating cylinder 2 on its ends. In the rotating part of the seal, a plurality of sealing elements 3, 4, 5 (e.g., packings, metal rings, or the like) made of suitable materials are guided mechanically exactly, creating a reliable sealing in cooperation with a rotationally stationary but radially movable sealing flange 6. Between annular sealing spaces formed by the sealing elements 3, 4, 5, the rotating sealing flange 1, and the rotationally stationary but radially movable sealing flange 6, a sealing gas or a sealing liquid can be fed by straightway valves or the like to provide a slight excess pressure relative to the space to be sealed. The slight excess pressure is sufficient to generate a flow in the direction of the rotating cylinder interior.

At a distance from the sealing flanges 1 and 6, a stationary sealing flange 7 is placed as part of a stationary frame structure 8. The stationary frame structure 8 can, for example, be a welded structure, so that between the stationary sealing flange 7 and the rotationally stationary but radially movable sealing flange 6 there is a compensator unit 9 welded in. The compensator unit 9 forms the elastic part of the seal and acts in particular to compensate for the wear of the sealing elements 3, 4, 5. It is designed as a metal compensator—for example, as a bellows. By spring 10, hydraulics, or pneumatics, the contact pressure of the rotationally stationary but radially movable sealing flange 6 against the sealing elements 3, 4, 5 can be kept at least approximately constant, and the wear of sealing elements 3, 4, 5 is compensated for within certain limits. By a sealing element 11 between the stationary sealing flange 7 and a rotating cylinder head 12, another sealing space is formed that protects the components of the sealing system from chemically aggressive pyrolysis gases, coke deposits, and the like.

The nonrotating part of the seal is secured against the moment exerted by the rotating part suitably by torque safety mechanisms (not shown) in the form of rigid rod joints between the stationary frame structure 8 and the stationary sealing flange 7. Both the rotationally stationary but radially movable sealing flange 6 and the stationary sealing flange 7 of the sealing system are kept parallel by the stationary frame structure 8 during all operating conditions occurring in practice. A ball bearing turning connection 13 is screwed with its inner ring onto the rotating sealing flange 1 of the sealing system. The outer ring of the ball bearing turning connection 13 is solidly connected to the stationary frame structure 8 that guarantees the nonpositive frame connection. For example it can be screwed on. The frame connection is screwed on the other end onto the stationary sealing flange 7. The stationary sealing flange 7, as already indicated above with respect to the rotationally stationary but radially movable sealing flange 6 (which is in contact with the sealing elements 3, 4, 5) is spanned by the compensator unit 9 to compensate for wear.

If used, for example, for low-temperature carbonization of hydrocarbon-containing residues of distillation, heavy oils, or the like, rotating cylinder structures are designed as a rotating cylinder with muffle heating to temperatures of a maximum of between 800° C. and 1200° C. The process pressure as a rule is at a pressure that is only a few hundred mbar above the outside air pressure.

The indirect heating of the rotating cylinder is advantageously performed by a stationary muffle placed around the rotating cylinder and heated with hot gases, and a suitable sealing between the rotating cylinder and the muffle guarantees a sufficient exploitation of the hot gases and an orderly conveyance of the latter.

According to the prior art, bearing races are attached directly to the hot rotating cylinder or have a direct, thermally conducting connection to the hot rotating cylinder.

Figure 2:
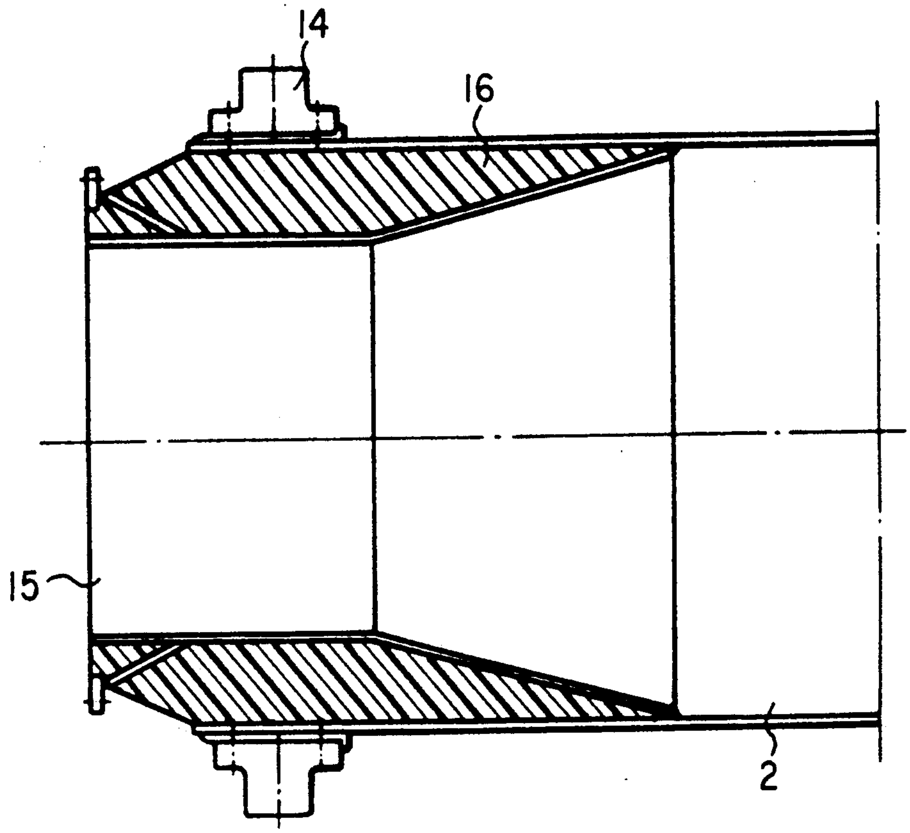
FIG. 2 is a schematic cross-sectional view of a rotating cylinder according to the invention.

Another advantageous embodiment of the rotating cylinder of the kind mentioned initially is one in which a plurality of bearing races 14 running on rollers are thermally insulated from the rotating cylinder 2 by an insulation 16 attached between the rotating cylinder 2 and a rotating cylinder tapering 15. The representation in FIG. 2 shows, for example, such an arrangement.

To clear away or loosen encrustations, coke deposits, or the like possibly forming in the rotating cylinder during operation, heavy, inner, longitudinally cylindrical rolling elements rolling on the rotating wall can be provided. By ribs, grooves, or undercuts running lengthwise on the rolling elements, the desired effect can be promoted depending on the requirements of the materials passing through.

CAVEAT

Obviously, numerous modifications and variations of the present invention are possible in light of the above teachings. It is therefore to be understood that, within the scope of the appended claims, the invention may be practiced otherwise than as specifically described herein.

What is new and desired to be secured by Letters Patent of the United States is:

1. A rotary kiln comprising:

(a) a stationary frame structure having a first surface that is perpendicular to the axis of the rotary kiln and a second surface that is perpendicular to the axis of the rotary kiln;

(b) a ball bearing turning connection mounted on the second surface of said stationary frame structure, said ball bearing turning connection having a first surface that is perpendicular to the axis of the rotary kiln and that abuts the second surface of said stationary frame structure and a second surface that is perpendicular to the axis of the rotary kiln;

(c) a rotating cylinder head mounted on the second surface of said ball bearing turning connection, said rotating cylinder head having a first surface that is perpendicular to the axis of the rotary kiln and that abuts the second surface of said ball bearing turning connection and a second surface that is coaxial to the axis of the rotary kiln;

(d) a rotating sealing flange mounted on the first surface of said rotating cylinder head;

(e) a rotating cylinder connected to said rotating sealing flange;

(f) a stationary sealing flange mounted on the first surface of said stationary frame structure, said stationary sealing flange having a first surface that is perpendicular to the axis of the rotary kiln and that abuts the first surface of said stationary frame structure and a second surface that is coaxial to the axis of the rotary kiln;

(g) a rotationally stationary but radially movable sealing flange spaced from said stationary sealing flange;

(h) a first sealing element located between said rotationally stationary but radially movable sealing flange and said rotating cylinder head;

(i) a second sealing element located between the second surface of said stationary sealing flange and the second surface of said rotary cylinder head;

(j) means for biasing said rotationally stationary but radially movable flange against said first sealing element with an at least approximately constant force despite wear of said first sealing element; and (k) a compensator unit disposed between said stationary sealing flange and said rotationally stationary but radially movable sealing flange.

2. A rotary kiln as recited in claim 1 wherein said rotating sealing flange is screwed to said rotating cylinder head.

3. A rotary kiln as recited in claim 1 wherein said rotating sealing flange is welded to said rotating cylinder.

4. A rotary kiln as recited in claim 1 wherein said first sealing element comprises a plurality of radially spaced sealing elements.

5. A rotary kiln as recited in claim 4 and further comprising a sealing fluid located between said radially spaced sealing elements.

6. A rotary kiln as recited in claim 1 wherein said stationary sealing flange is screwed to said stationary frame structure.

7. A rotary kiln as recited in claim 1 wherein said compensator unit comprises a bellows.

8. A rotary kiln as recited in claim 1 wherein said rotating cylinder head is screwed to said ball bearing turning connection.

9. A rotary kiln as recited in claim 1 wherein said stationary sealing flange is screwed to said ball bearing turning connection.

* * * * *